Sept. 26, 1967  D. H. BOYER  3,343,431
TOOL HOLDER
Filed Oct. 11, 1965  3 Sheets-Sheet 1
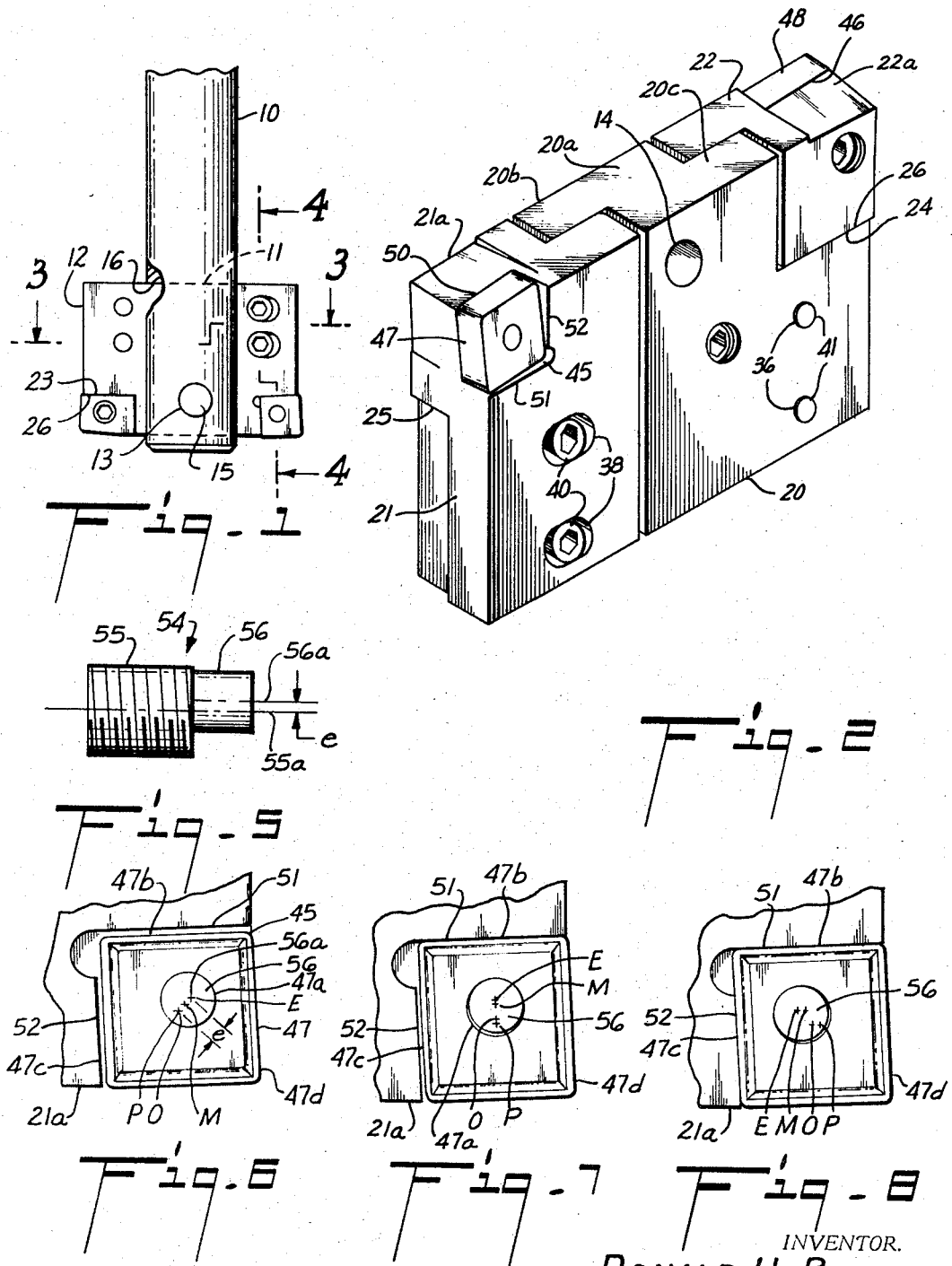
INVENTOR.
DONALD H. BOYER
BY
ATTORNEYS

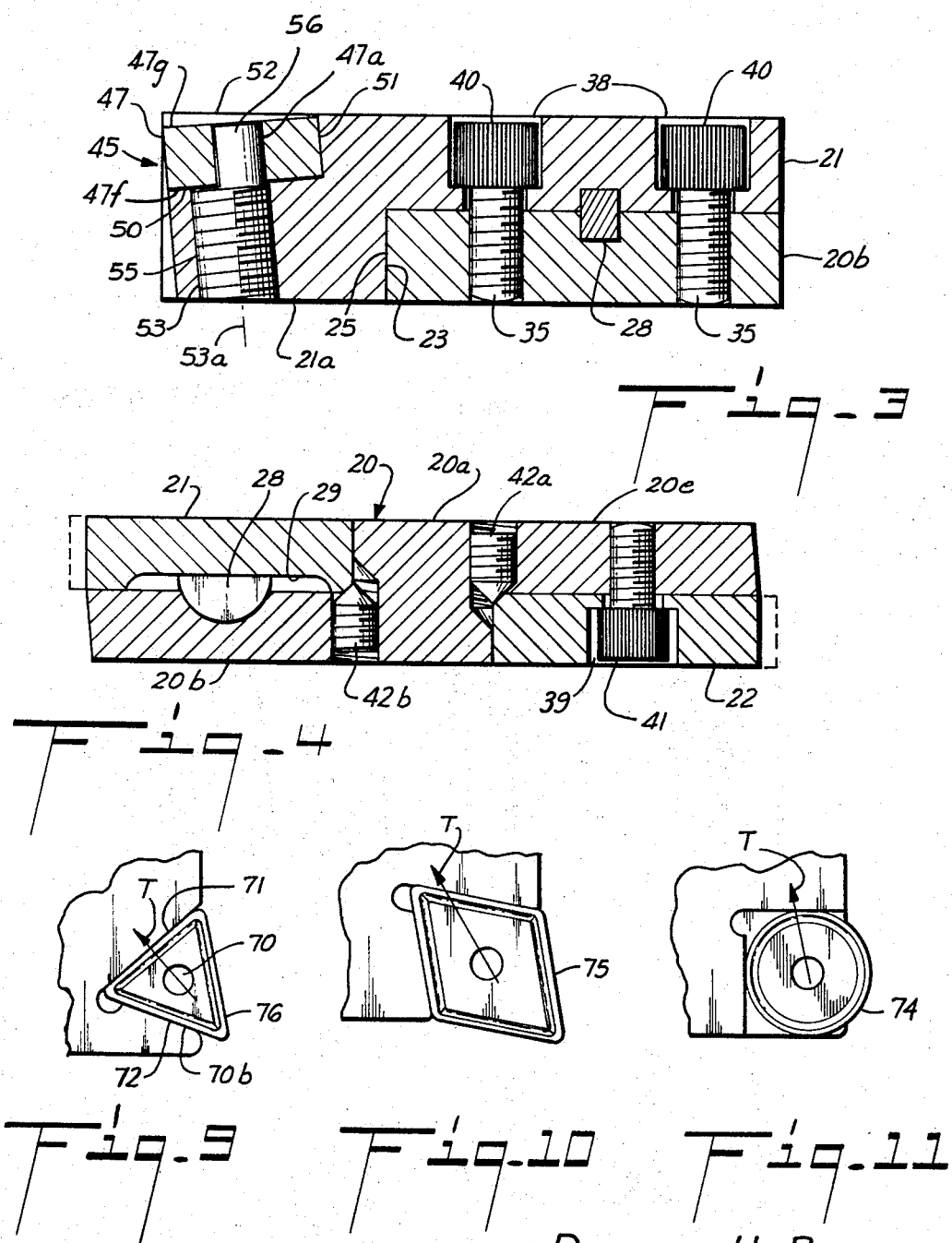

United States Patent Office 3,343,431
Patented Sept. 26, 1967

3,343,431
TOOL HOLDER
Donald H. Boyer, 1819 Antoine Drive,
Houston, Tex. 77055
Filed Oct. 11, 1965, Ser. No. 494,723
12 Claims. (Cl. 77—58)

ABSTRACT OF THE DISCLOSURE

A tool holder is provided for throw away inserts that have central mounting holes. The holder has a pocket to receive the insert. The pocket has a bottom surface and first and second intersecting side walls. A pin is mounted for rotation in an opening in the bottom of the pocket. An eccentric is attached to the pin and extends into the pocket for engaging the mounting hole of the insert. The throw of the eccentric, the distance from the hole in the pocket to the side wall, and the clearance between the eccentric and the pin and the holes in which they are located, are arranged to move the insert into engagement with the first wall, as the eccentric is rotated to position its throw normal to the first wall. Continued rotation of the eccentric moves the insert into engagement with the second wall, while it continues holding the insert in engagement with the first wall. Further rotation of the pin is then resisted, allowing the frictional forces to be increased between the pin and the opening, the eccentric and the mounting hole, and the insert and the walls of the pocket. The tool holder is shown on an adjustable boring block. The block has a Z-shaped body to provide two arms to support two laterally movable tool holding members. Each arm of the body is notched at one outer corner to provide a guide surface parallel to the direction of travel of the tool holding member. The tool holding members each have a surface that is parallel to and in engagement with the surface on the arms so the longitudinal forces imposed on the members will be transmitted to the body through these engaging surfaces.

---

This invention relates to tool holders generally. In one of its aspects it relates to an improved tool holder for cutting tools of the reversible and replaceable type, such as those made from tungsten carbide, and which are referred to generally as throw away inserts. In another aspect this invention relates to an improved boring block that can be adjusted to bore a range of diameters. And in still another aspect this invention relates to such an adjustable boring block that employs said improved tool holder.

Throw away inserts are provided in a variety of shapes. They are square, triangular, diamond shaped, and round. They usually have two parallel side faces, a peripheral edge surface that is normal to the side faces, and a central mounting hole. They are made of extremely hard material, such as tungsten or tantalum carbide, and the entire edge of both faces usually can serve as a cutting edge. Thus, it is desirable to mount these inserts in tool holders so that when one portion of the cutting edge becomes dull, the insert can be repositioned by either rotating it or turning it over to bring another portion into cutting position with a minimum of effort while providing rigid support for the insert in the tool holder.

It is therefore an object of this invention to provide an improved tool holder for throw away inserts.

It is another object of this invention to provide a tool holder for throw away inserts that will rigidly hold the insert during the cutting operation but which is quickly released to allow the insert to be repositioned in the holder to present a new cutting edge to the work piece.

It is yet another object of this invention to provide a tool holder for a throw away insert that employs a cam or eccentric to secure the insert in the holder in the cutting position and to release it therefrom but which is not used to hold the insert against the forces imposed on it by the cutting operation.

It is another object of this invention to provide a holder for a throw away insert type of cutting tool that employs an eccentric to releasably secure the insert in the holder which will not release the insert when subjected to the usual vibrations imposed on the holder by the cutting operation.

It is another object of this invention to provide a holder for a throw away insert that will return the cutting edge of the insert to the same position relative to the holder each time the insert is repositioned or exchanged by providing three support surfaces that are fixed relative each other.

It is another object of this invention to provide a holder for a throw away insert that will engage the insert on three sides and rigidly support the insert during cutting operations.

These throw away inserts can operate at very high cutting speeds as long as their overhang is held to a minimum and they are well supported. This is a particularly difficult problem in boring blocks that can be adjusted through a range of diameters. If the insert itself is moved relative to its support, the overhand of the tool at the large diameter is such that the efficiency and the life of the insert, along with the speed at which it can be operated, is reduced substantially. Where the insert is located on a member that is moved to adjust the diameter of the boring block, it is difficult to maintain a rigid support for the insert.

Therefore, it is another object of this invention to provide an adjustable boring block for use with throw away inserts that holds the overhang of the insert constant as the overall diameter of the boring block is changed and which provides a rigid support for the insert throughout the range of diameters through which the block can be adjusted.

It is an additional object of this invention to provide an adjustable boring block that employs throw away type of cutting inserts that can be adjusted through a limited predetermined range of diameters to insure that the block is not extended to the point where it will not provide sufficient rigidity for the high speed operation of the throw away inserts.

It is another object of this invention to provide an adjustable boring block that can be quickly and easily adjusted to different diameters within the range of diameters for which it is designed.

It is a further object of this invention to provide an adjustable boring block that can make rough cuts as well as finished cuts which are concentric with the longitudinal axis of the boring bar.

These and other objects, advantages, and features of this invention will be apparent to those skilled in the art from a consideration of this specification and attached drawings.

A tool holder constructed in accordance with this invention, comprises a member having a pocket or recess to receive the insert. The pocket provides three support surfaces for the insert; a bottom surface and first and second side walls. First means are rotatably mounted in an opening through the bottom surface and second means are located in the pocket and carried by the first means for rotation therewith. The second means are arranged to engage the central mounting hole in an insert, and when rotated in one sense by the first means, to move the insert first into engagement with the first side wall and then with continued rotation in the same sense to move it into engagement with the other side wall, said first and second means being so arranged and constructed with respect to the openings in which they rotate, that they will cooperate to hold the insert in engagement with the first wall while the insert is moved and held against the second wall.

In the preferred embodiment, the first means comprises a threaded pin located in a threaded opening in the pocket. The second means comprises a cylinder mounted on the pin with its longitudinal axis offset from the longitudinal axis of the pin to provide an eccentric having a throw equal to the distance between the offset axes. To permit assembly and relative rotation, clearance is provided between the pin and the opening and between the eccentric and the mounting hole in the insert. By arranging the elements of the holder in accordance with this invention, these clearances are used to cause the eccentric to hold the insert in engagement with both side walls.

The adjustable boring block of this invention has a body member adapted to be secured in a boring bar in the conventional manner upon which is mounted two laterally movable tool holding members. These members are arranged in such a novel manner that the overall dimensions of the block are substantially the same as a non-adjustable block for boring an equivalent diameter, while providing guide surfaces on the body and the tool holding members that have sufficient areas in interengagement, even when the tool is extended to bore its largest diameter, for the body to provide rigid support for the tool holding members during boring operations.

The tool holder of this invention can be employed to hold a throw away insert to perform various machining operations.

The preferred embodiment of the invention will now be described in connection with the attached drawings, in which:

FIGURE 1 is a view in elevation of a conventional boring bar with the adjustable boring block and tool holder of this invention mounted therein;

FIGURE 2 is an isometric view of the boring block of FIGURE 1;

FIGURE 3 is a cross sectional view of the boring block of FIGURE 1 taken along line 3—3;

FIGURE 4 is a cross sectional view of the block of FIGURE 1 taken along line 4—4;

FIGURE 5 is a view in elevation of the eccentric and pin assembly employed by the tool holder of this invention;

FIGURES 6, 7 and 8 illustrate how rotation of the assembly of FIGURE 5 secures an insert in the pocket of the tool holder;

FIGURES 9, 10 and 11 illustrate the tool holder of this invention arranged to hold diamond shaped, triangular, and circular inserts, respectively.

Figure 12:
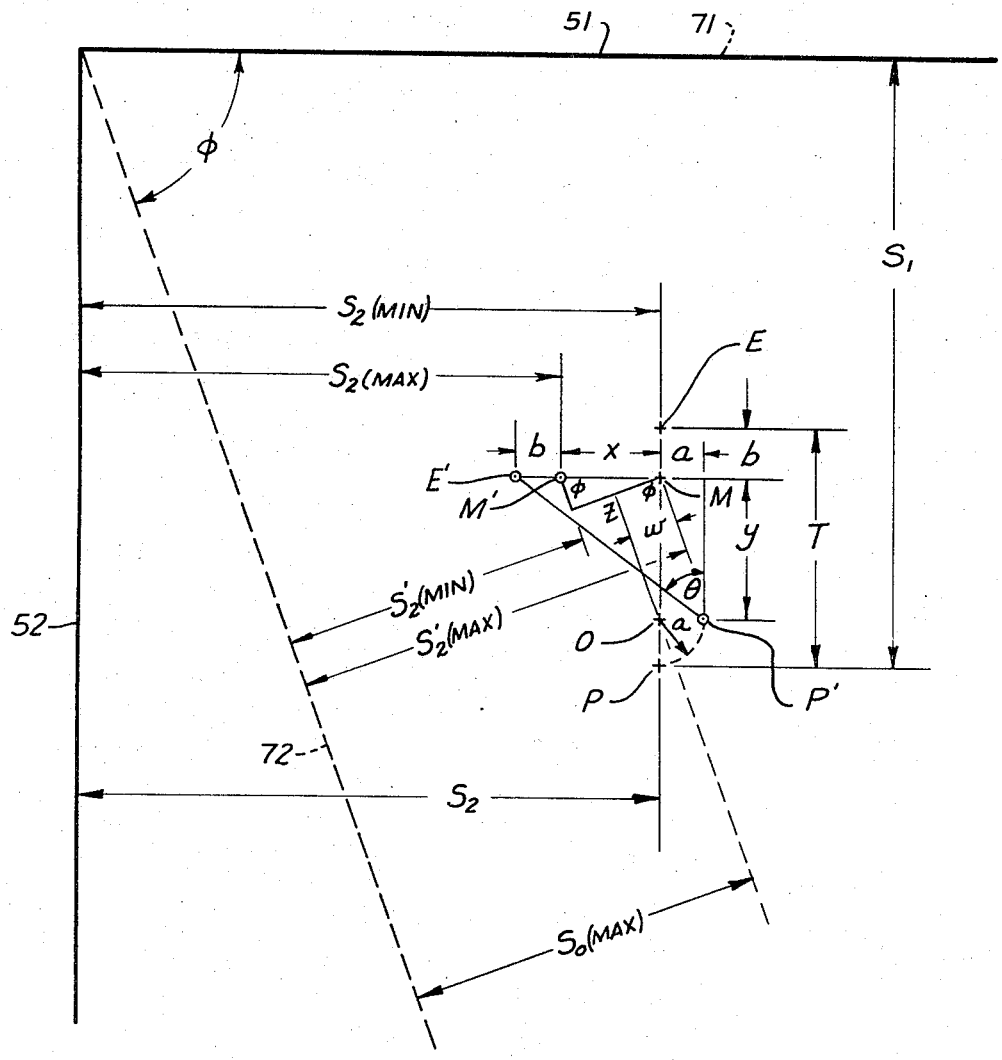
FIGURE 12 is a drawing on an enlarged scale illustrating the positions of the centers on the moving elements of the tool holder as an insert is moved into engagement with the side walls of the pocket.

Boring bar 10 is of the conventional type having a transverse slot 11 to receive boring block 12. The bar is provided with a transverse opening 13 for alignment with opening 14 in the boring block to receive pin 15. The pin is tapered to force the boring block against back side 16 of slot 11 to hold it firmly in the slot in the well known manner.

Boring block 12 is adjustable through a range of diameters. It comprises rectangular body member 20 that is generally "Z" shaped in longitudinal cross section, as shown in FIGURES 2 and 4. The body has a central section 20a, having a thickness only slightly less than the width of transverse slot 11 in the boring bar, and two oppositely extending tool holder supporting arms 20b and 20c. The arms are flush with opposite sides of the center section of the body and have a thickness less than that of the center section. Each arm has a rectangular notch in one corner thereof to provide laterally extending guide surface 23 on arm 20b and guide surface 24 on arm 20c. These surfaces are normal to the longitudinal axis of the boring bar, when the block is mounted therein.

Mounted on arms 20b and 20c are tool holding members 21 and 22. The members are of identical shape. They overlap arms 20b and 20c respectively and have a thickness such that they combine with the arms to provide a combined thickness substantially equal to the thickness of the center section of the body. The tool holding members also are provided with portions 21a and 22a having a thickness substantially equal to the center section body. These portions extend into the notched corners of the arms and have surfaces 25 and 26 that slidably engage guide surfaces 23 and 24 respectively. These interengaging surfaces guide the tool holding members as they move to extended and retracted positions relative to the arms. Further these interengaging surfaces have ample areas in contact, even when the block is extended to its maximum diameter, to rigidly support the tool holding members during boring operations.

Additional means are provided to guide the tool holding members as they move along guide surfaces 23 and 24. In the embodiment shown, a guide key is located between each tool holding member and the arm which supports it. In the drawings only key 28 is shown. It is mounted in arm 20b to engage key way 29 in tool holding member 21, as shown in FIGURES 3 and 4.

Means are provided to hold tool holding members 21 and 22 against lateral movement after they are located in the desired position relative to the arms and to limit the amount of such lateral movement. Tapped holes 35 and 36 are located in arms 20b and 20c, respectively, and the tool holding members are each provided with a pair of elongated openings 38 and 39 through which cap screws 40 and 41 extend to threadedly engage the tapped holes in the arms. The length of the elongated openings determine the extent of lateral movement of the members and the maximum dimension to which the boring block can be adjusted. This prevents the block from being adjusted to a bore diameter such that insufficient area is in engagement between guide surfaces 23 and 25 and surfaces 24 and 26 to rigidly support the tool holding members.

To adjust the position of the tool holding members relative to the arms, tapered end set screws 42a and 42b are located for their ends to engage beveled surfaces on the inner edge of the tool holding members as shown in FIGURE 4. Thus, by loosening the cap screws holding the members on the body, the tool holding members can be moved laterally by screwing down on the set screws.

The boring block just described is provided with tool holders for holding cutting tools of the throw away insert type. The tool holders comprise pockets 45 and 46 provided in members 21 and 22, respectively to receive square inserts 47 and 48. The tool holders are identical so only one will be described in detail.

Pocket 45 in member 21 (FIGURES 2 and 3) is defined by bottom surface 50 and first and second side walls 51 and 52 that are at right angles to each other and normal to the bottom surface. Insert 47 has two parallel faces 47f and 47g and four sides 47b, 47c, 47d, and 47e that form a peripheral surface that is normal to the faces to provide two cutting edges on the insert. The bottom surface of the pocket is inclined downwardly, as shown in FIGURE 3, to provide a clearance angle between the peripheral edge surface of the insert and the work piece (not shown).

Means are provided to move the insert into engagement with the first side wall and then into engagement with the second side wall, while holding the insert in engagement with the first wall. In the embodiment shown, opening 53 in the member extends through the bottom surface and is normal thereto. The longitudinal axis 53a of the opening is located closer to second wall 52 than it is to first wall surface 51 for purposes which will be explained below. Opening 53 is tapped to receive threaded pin portion 55 of pin-eccentric assembly 54 shown in FIGURE 5.

Some clearance is required between the threads of the pin and the threads in the opening and between the eccentric and the mounting hole in the insert to allow them to rotate easily relative to each other. It has been found that by spacing the opening from the side walls in a certain way, these clearances will cause the eccentric to hold the insert firmly in engagement with both side walls at the same time.

This will result if the force exerted on the wall of the mounting hole by the insert has components urging the insert toward both walls, or at least not urging the insert away from one of the walls, when the insert engages both walls. This results by spacing the first side wall from the center of the opening in the pocket a distance that is less than the throw of the eccentric plus the distance from the center of the mounting hole in the insert to the nearest point on its side that engages the first wall by an amount substantially equal to but no greater than the amount of clearance provided between the pin and the opening and between the eccentric and the mounting hole. This will cause the eccentric pin assembly to move the insert into engagement with the first side wall when the throw of the eccentric is normal to it. The movement of the parts to this position is shown in FIGURES 6 and 7.

To better explain these movements, the pertinent center lines have been designated. The center line of the opening is designated "O", the pin "P", the eccentric "E", and the mounting hole "M." In FIGURE 6, the pin is being rotated counterclockwise thereby moving side 47b of the insert toward first wall 51 and the center lines will be about as shown. The center lines of the pin and the opening may or may not coincide, as shown, but they probably won't be far apart.

In FIGURE 7 the throw of the eccentric is normal to wall 51. The sum of the distances between the center lines of each pair represents the out of register of the center line of the pin and eccentric and the holes in which they are located that results from the throw of the eccentric urging the insert against side wall 51. This sum cannot exceed the sum of the clearances of the pin and eccentric in their respective openings and for simplicity is termed "interference." Usually, the total clearance provided is greater than the interference since as a practical matter, it is tool difficult to machine the parts to this close a tolerance. If the insert in this position is in engagement with both side walls, further rotation of the pin will cause center line E to move toward the second wall and away from the first. The mounting hole, however, cannot move so this movement of the eccentric will cause the center line of the pin to move around the center line O of the opening and away from it until the pin engages the wall of the opening. When this occurs the pin cannot be rotated further and the insert will be held firmly in engagement with both side walls.

If the insert has not engaged wall 52 when the throw of the eccentric is normal to the first wall, continued movement of the parts past the normal position can occur. As the pin is further rotated in a counterclockwise direction, the eccentric will move the insert along the first wall toward the second. The point of contact between the eccentric and the mounting hole will shift also. As long as this point of contact is above a line passing thtrough the center of the mounting hole parallel to the first wall, one component of the force exerted on the insert by the eccentric will be urging the insert toward the first wall. Thus, there is a limit to how far the second wall can be spaced from the opening. This maximum distance depends on the dimension of the members, the interference, etc. It also depends on the shape of the insert. It can be readily calculated for each case, however.

Referring to FIGURE 12 the position of the centers of the elements of the holder are shown in two positions; when the throw of the ecentric is normal to the first wall 51 and when the center of the eccentric E is on a line that passes through the center of the mounting hole M parallel to the first wall. This latter position represents the maximum distance the insert can move toward the second wall 52 before the eccentric will start pulling the insert away from the first wall. The centers in the first position are shown as crosses and in the second as circles. Also, in the latter position their letter designations are primed. The letters "$a$" and "$b$" represent the clearances between the pin and the opening and between the eccentric and the mounting hole respectively. "$T$" is the throw of the eccentric. $S_1$ is the distance from the center of the opening "O" to the first side wall 51. $S_2$ is the distance from the center of the mounting hole to the second side wall 52.

"$X$" is the maximum distance that the centers of the mounting hole "M" can move toward the second wall 52 before the eccentric begins to pull the insert away from the first wall. From FIGURE 12 it is seen that, $$X = T \sin \theta - (a+b)$$

This is for the case where the side walls are at right angles. The inserts have other shapes, however, such as those shown in FIGURES 9, 10 and 11.

Circular insert 74 in FIGURE 11 can be held in the same manner as the square insert described above, since it can be arranged to engage side walls at right angles to each other. For diamond shaped insert 75 and triangular shaped insert 76 (however, the second side wall of the tool holder should be closer to the opening in the pocket than it was where the walls are at right angles to each other. This is necessary because the throw of the insert, when it is normal to the first side wall, is not parallel to the second side wall. For example, in FIGURE 9, when the throw of eccentric 70 is normal to side wall 71, it will not be parallel to side wall 72. Thus, if the center of mounting hole 73 was spaced from side wall 72, a distance equal to the distance from the center of the mounting hole to the side wall of the insert, the insert would not yet be in engagement with the second side wall. Therefore, as shown in FIGURE 12, the maximum distance $S_{2'}(\max)$, that side wall 72 can be spaced from the center of the mounting hole "M" is equal to $S_{2'}(\min)$, the distance from the center M to the side of the insert plus $Z$, and:

$$Z = X \sin \phi$$

The angle $\phi$ of course, is the angle between the side walls.

Thus, the general formula for S (max) for all angles is:

$$S(\max) = S(\min) + [T \sin \theta - (a+b)] \sin \phi$$

In determining the maximum spacing $S_0$ (max) from the center of opening O, S (max) is reduced by an amount "$w$" which is equal to $$y \cdot \cos \phi$$

In one embodiment of the invention designed for one-half inch square inserts, the opening is spaced .265″ from the first side wall and .250″ from the second side wall. The throw of the insert is .025″; a ⅜″ NC class 2 thread is used between the pin and the opening; and .005″ clearance is provided between the eccentric and the mounting hole of the insert. Usually, the mounting hole will vary in diameter plus or minus .001″.

With this arrangement, the interference when the throw is normal is about .010″. With the clearances provided, however, the throw of the eccentric can be moved to a position normal to the first side wall. Then further rotation of the pin will remove the remaining clearance and, if it has not already occurred, move the insert into engagement with both side walls. At this point torque can be applied to the pin to increase the normal force between the members and particularly between the threads on the pin and the opening. This will provide sufficient frictional forces to hold the pin against rotation during normal machining operations.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is.

1. A tool holder for throw away inserts having a central mounting hole, comprising a member having an insert receiving pocket defined by a bottom surface and first and second side walls that intersect the bottom surface and each other, said member having an opening normal to the bottom surface, first means rotatably mounted in the opening and second means carried by the first means to engage the mounting hole of such insert and move such insert into engagement with the first side wall when the first means is rotated in one sense and with further rotation of the first means in the same sense to move such insert into engagement with the second side wall, said first and second means cooperating to hold the insert in engagement with the first side wall while the insert is moved and held against the second side wall.

2. A tool holder for a throw-away insert that has opposite faces, a peripheral side surface, and a central mounting hole normal to said faces, said holder comprising a member having an insert receiving pocket defined by a bottom surface and first and second intersecting side walls that are normal to the bottom surface in which the insert can be located with portions of its peripheral edge surface in engagement with the first and second side walls, said member having an opening therein that extends through the bottom surface, a pin rotatably mounted in the opening in the member and an eccentric attached to the pin for rotation therewith and adapted to engage the mounting hole of the insert to cause the throw of the eccentric to move the insert toward and away from the side surfaces of the pocket as the pin is rotated, said pin and said eccentric being constructed and arranged to have a predetermined clearance between them and the opening and mounting hole respectively, the center of said opening being spaced from the second side wall between a minimum distance substantially equal to the distance from the center of the opening to the side of the insert adjacent said second wall when the throw of the eccentric is normal to the first wall, and a maximum distance such that the insert will engage said second side wall and stop further rotation of the pin before the center of the eccentric moves away from the first side wall past a line that is parallel to said wall and which passes through the center line of the mounting hole when the throw of the eccentric is normal to said wall, and from the first side wall a distance that is less than the throw of the eccentric plus the distance from the center of the mounting hole to the portion of the peripheral side surface of the insert that engages said first surface by the amount of clearance provided between the pin and the eccentric and the opening and the mounting hole, whereby rotation of the pin will move the insert first into engagement with the first side wall and then into engagement with the second side wall while remaining in engagement with the first side wall.

3. The tool holder of claim 2 in which the pin and the opening in the member are provided with interengaging threads.

4. A tool holder for a throw away insert that has a mounting hole therein, said holder comprising a member provided with an inert supporting pocket, said pocket being defined by a bottom surface and first and second intersecting side walls that are normal to the bottom surface, said member having an opening that passes through and is normal to the bottom surface with its center line located closer to the second side surface than to the first, a pin rotatably mounted in the hole, and means for holding an insert in the pocket in engagement with both side surfaces, comprising an eccentric mounted on the pin for rotation therewith for engaging the mounting hole of such insert to move such insert first into engagement with the first side surface as the pin is rotated in one direction and then into engagement with the second side surface as the pin is rotated further in the same direction while holding such insert in engagement with the first surface.

5. The tool holder of claim 4 in which the second wall is spaced from the center of the mounting hole when the throw of the eccentric is normal to said first wall a maximum distance S (max) which is equal to:

$$S\ (\min) + (T\sin\theta - C)\sin\phi$$

where:

S (min) is the distance from the center of the mounting hole to the side of the insert, T is the throw of the eccentric, $\theta$ is the angle between a line perpendicular to the first wall and a line through the center of the pin and the center of the eccentric when the center of the eccentric and the center of the mounting hole lie on a line parallel to the first side wall, C is the total clearance between the pin and the opening and between the eccentric and the mounting hole, and $\phi$ is the angle between the walls.

6. A tool holder for throw-away inserts having parallel faces, a peripheral surface normal to said surfaces to provide cutting edges around said faces, and a central hole normal to the faces, said holder comprising a member having a pocket therein to receive one such insert, said pocket being defined by a bottom surface and first and second intersecting side walls that are normal to the bottom surface, said member having an opening that passes through and is normal to the bottom surface of the pocket, and means for holding such insert in engagement with both side walls comprising, a pin rotatably mounted in the opening in the pocket, an eccentric mounted on the pin for rotation therewith and adapted to engage an insert mounting hole and move such insert into and out of simultaneous engagement with both side walls as the pin is rotated, said opening in the pocket being spaced from the first side wall to cause the eccentric to move such insert firmly against the side of the eccentric toward said wall and to move the pin firmly against the side of the opening away from the wall as the throw of the eccentric reaches a position normal to the wall, said opening being spaced from the second side wall a distance such that the insert will engage said second wall when the throw of the eccentric is about normal to the first wall whereby torque on the pin urging the eccentric toward the second wall past a position normal to the first wall will move the pin toward the side of the opening away from the second wall and toward the first wall to hold the insert in engagement with both walls.

7. A tool holder for throw-away inserts having top and bottom surfaces and a peripheral surface adapted to form cutting edges with at least one of the top and bottom surfaces and a central mounting hole through said insert, said holder comprising a member having a pocket to receive one such insert, said pocket being defined by a bottom surface and first and second wall surfaces that intersect the bottom surface and each other to form a corner, said bottom surface having an opening therein, a pin rotatably mounted in the opening, said pin having a diameter less than the opening to provide clearance therebetween, an eccentric attached to the pin to be rotated thereby and to engage the hole in the insert, said eccentric having a diameter less than said hole to provide clearance therebetween, said eccentric having a throw such that the throw plus the distance from the center of the mounting hole in the insert to the portion of its peripheral edge that engages the first wall surface is greater than the distance from the center of the opening in the bottom surface to the first wall surface by an amount substantially equal to the combined clearance between the eccentric and the mounting hole and between the pin and the opening to substantially increase the friction between the eccentric and the mounting hole, the pin and the opening, and the insert and the first wall when the throw of the eccentric is normal to said wall, said holder further having said opening in the pocket spaced from the second wall for such insert to engage the second wall when the throw of the eccentric is about normal to the first wall.

8. The tool holder of claim 7 in which the pin and the opening in the member are provided with interengaging threads.

9. The tool holder of claim 7 in which the combined clearance is between .005″ and .015″.

10. An adjustable boring block for mounting in the transverse slot of a boring bar to be held in place therein by a pin extending through the bar and a tapered opening in the block comprising, a generally rectangularly shaped body having a center section and two arms on opposite sides of the center section, said arms having a thickness less than that of the center section and a guide surface that lies in a plan normal to the longitudinal axis of the boring bar, a tool holding member mounted on each arm, each member having a thickness such that the combined thickness of it and the arm upon which it is mounted is equal to or less than that of the center section of the body, each member further having a portion with a thickness greater than the arm and equal to or less than the center section of the body, said portion having a side parallel to and in sliding engagement with the guide surface on the arm, releasable holding means for holding the members against lateral movement relative to the arms along said guide surfaces, key means for guiding each member along the guide surfaces of the arms as they are moved laterally thereto, tool holding means on each of said members for holding throw-away inserts of the type having a central mounting hole, said means including a pocket defined by a bottom surface and first and second intersecting side walls that are normal to the bottom surface, each member having an opening that passes through and is normal to the bottom surface of its pocket, a pin rotatably mounted in the hole, and means for holding an insert in the pocket in engagement with both side surfaces, comprising an eccentric mounted on the pin for rotation therewith to engage the mounting hole of such insert and move such insert first into engagement with the first side wall as the pin is rotated in one direction and then into engagement with the second side wall as the pin is rotated further in the same direction, while holding such insert in engagement with the first wall.

11. An adjustable boring block for mounting in the transverse slot of a boring bar to be held in place therein by a pin extending through the bar and a tapered opening in the block comprising, a generally rectangularly shaped body, a center section and two arms, each of which is mounted on opposite sides of the center section from the other, said arms having a thickness less than that of the center section and a reduced width adjacent their outer edges to provide a guide surface that lies in a plane normal to the longitudinal axis of the boring bar, a tool holding member mounted on each arm, each member having a thickness such that the combined thickness of it and the arm upon which it is mounted is equal to or less than that of the center section of the body, each member further having a first portion with a thickness greater than the arm and equal to or less than the center section of the body, said first portion having a side parallel to and in sliding engagement with the guide surface on the arm, and tool holding means for mounting a cutter releasable holding means for holding the members against lateral movement relative to the arms, and key means for guiding each member along the guide surfaces of the arms as they are moved laterally thereto.

12. An adjustable tool holder for boring bars comprising a rectangular body having a width and depth such that it can be inserted in a transverse slot in a boring bar and a length such that it will extend laterally out from the boring bar when centered in the slot, said body being generally "Z" shaped in longitudinal cross section to provide two arms of reduced thickness extending laterally from the boring bar, each of said arms having a notched corner to provide a guide surface which is set in from the edge of the body, and which is normal to the longitudinal axis of the boring bar, two tool holding members, each member being slidably mounted on one of the arms and having a portion of increased thickness extending into the notched corner of the arm and slidingly engaging the guide surface of the arm, key means between each arm and the tool holding member mounted thereon to guide the member along the guide surface as it moves laterally relative to the arm, and means for releasably and independently holding each member against lateral movement and for limiting the lateral movement of the members relative to the arms.

References Cited

UNITED STATES PATENTS

| | | |
|---|---|---|
| 1,096,799 | 5/1914 | Weeks. |
| 1,290,206 | 1/1919 | Howk. |
| 3,187,406 | 6/1965 | Franko _____ 29—96 X |

FOREIGN PATENTS 594,618  3/1960  Canada.

WILLIAM W. DYER, Jr., Primary *Examiner.*
GERALD A. DOST, *Examiner.*